United States Patent [19]
Yasuda et al.

[11] Patent Number: 5,971,099
[45] Date of Patent: Oct. 26, 1999

[54] SOUNDPROOF MATERIAL

[75] Inventors: Zenichi Yasuda, Gifu; Yutaka Ogasawara, Ogaki; Kuniyasu Ito, Hashima, all of Japan

[73] Assignee: Toyoda Gosei Co., Ltd., Aichi-ken, Japan

[21] Appl. No.: 09/098,959

[22] Filed: Jun. 17, 1998

[30] Foreign Application Priority Data

Jun. 17, 1997 [JP] Japan .................................. 9-159607

[51] Int. Cl.⁶ ...................................................... E04B 1/82
[52] U.S. Cl. ........................... 181/286; 181/290; 181/294
[58] Field of Search .................................... 181/284, 286, 181/290, 294, 295

[56] References Cited

U.S. PATENT DOCUMENTS

| | | | |
|---|---|---|---|
| 4,242,398 | 12/1980 | Segawa et al. ........................ | 181/290 |
| 4,851,283 | 7/1989 | Holtrop et al. ......................... | 181/290 |
| 4,966,799 | 10/1990 | Lucca et al. ............................ | 181/290 |
| 5,258,585 | 11/1993 | Juriga ...................................... | 181/286 |
| 5,298,694 | 3/1994 | Thompson et al. ..................... | 181/286 |

*Primary Examiner*—Khanh Dang
*Attorney, Agent, or Firm*—Pillsbury Madison & Sutro LLP

[57] ABSTRACT

A lightweight and inexpensive soundproof material which is reclaimable comprises a thermoplastic resin substrate and a non-woven cloth laminated on a surface of the substrate and made from thermoplastic resin fibers different from the material of the substrate. The assembly of fibers and the substrate are bonded together integrally through a joint interface which is at least partially molten by ultrasonic vibration.

6 Claims, 2 Drawing Sheets

SOUNDPROOF MATERIAL

BACKGROUND OF THE INVENTION

1. Field of the Invention

This invention relates to a soundproof material and, specifically, to a soundproof material which is adapted to be installed in a car engine room or the like to prevent the noise of an engine from leaking to the outside of the car. More specifically, it relates to a reclaimable soundproof material.

2. Related Art

To prevent the noise of an engine from leaking to the outside of the car, an engine cover 101 is provided on the top of a cylinder head cover of an engine 100, or an under cover 102 is provided below the engine 100 as shown in FIG. 4. Each of the engine cover 101 and the under cover 102 is composed of a thermoplastic resin substrate and a sound absorbing material laminated on a side of the substrate facing the engine. The sound absorbing material absorbs the noise of the engine to prevent such noise from leaking to the outside of the car.

Since a sound absorbing material is required to have a heat resistant enough to withstand heat transmitted from the engine, glass wool-based, foamed urethane-based and hair felt-based sound absorbing materials are generally used. As shown in FIG. 5, a soundproof material is constructed by laminating a sound absorbing material 201 on a substrate 200 through an adhesive layer 202 such as adhesive agent or adhesive double-coated tape. The sound energy of sound waves penetrating into pores in the sound absorbing material 201 attenuates gradually by the viscous resistance of the air nearby and the vibration of the sound absorbing material 201 itself, whereby sound is absorbed and the leakage of noise to the outside of a car can be suppressed.

For the effective use of resources on the earth, products produced from materials which can be molten or reused, such as thermoplastic resin products and glass products, are reclaimed by collecting usable materials from waste articles and melting them to produce new products. In the case of auto parts, the name of raw material is written on each resin members to facilitate the classification of collected resin members by type of material, thus promoting the reclamation of the auto parts.

However, in the above soundproof material of the prior art, the substrate 200, the sound absorbing material 201 and the adhesive layer 202 are made from different materials. In addition, the sound absorbing material 201 and the adhesive layers 202 are not thermoplastic in most cases and it is difficult to collect and reclaim them directly. That is, only the substrate 200 is reclaimable. The process for completely separating the substrate 200 from the sound absorbing material 201 is very involved.

Even if the substrate 200 is separated from the sound absorbing material 201 completely, a glass wool-based sound absorbing material is difficult to be reclaimed and not allowed to be burn off. Therefore, there is no other alternative but to scrap it as industrial waste matter. It is also difficult to reclaim a foamed urethane-based sound absorbing material. Therefore, use of a new substrate 200 and a new sound absorbing material 201 prevents an increase in costs as compared with the reclamation thereof and a performance problem is avoided. Therefore, the sound absorbing material is scrapped after use in most cases. Thus, effective use of resources cannot be realized.

It cannot be said that a hair felt-based sound absorbing material 201 is preferred from the view point of reducing fuel cost by reducing the weight of a car because it has a relatively large specific gravity. Further, the process for joining the substrate 200 and the sound absorbing material 201 is involved and then the processing cost becomes high.

SUMMARY OF THE INVENTION

It is an object of the present invention to provide a lightweight, inexpensive and reclaimable soundproof material.

To this end, according to the present invention, there is provided a soundproof material comprising a thermoplastic resin substrate and an assembly of fibers laminated on a surface of the substrate and made from thermoplastic resin fibers different from the material of the substrate, wherein the assembly of fibers and the substrate are bonded together integrally through a joint interface which is at least partially molten by ultrasonic vibration.

The above and other objectives, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENT

Figure 1:
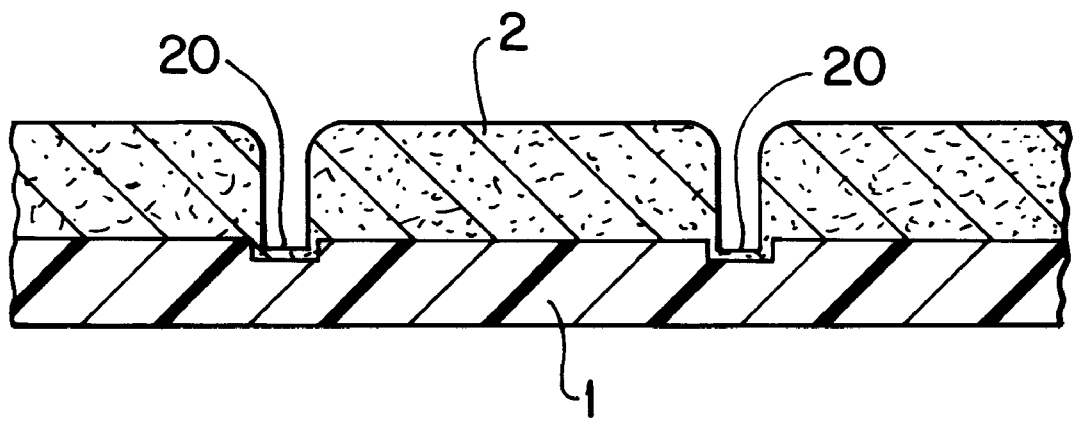
FIG. 1 is a sectional view of a sound absorbing material according to an embodiment of the present invention.

In the soundproof material of the present invention, a substrate and an assembly of fibers are made from different thermoplastic resins and bonded together integrally through a joint interface formed by melting them with ultrasonic vibration.

It is known that even when two members made from different thermoplastic resins are bonded together by hot plate welding, bond strength therebetween is extremely low and not practical. However, according to studies conducted by the inventors of the present invention, it has been found that a sufficiently practical bonding strength can be achieved by bonding together the substrate and the assembly of fibers through a joint interface which is formed by at least partially melting them with ultrasonic vibration. Although the reason for this is not clear completely, it is considered that two different molten resins are well mixed and mechanically tangled together by pressing the end of a transducer for ultrasonic welding against the assembly of fibers and applying ultrasonic vibration thereto, whereby improving the bonding strength.

It is desirable that the material of the substrate and the material of the assembly of fibers should have melting points close to each other. For example, when the soundproof material is used as a car engine cover, in most cases, the substrate is made from polyamide (PA) having relatively high heat resistance and the assembly of fibers is made from polyethylene terephthalate (PET). The difference of the melting point between the PA and the PET is about 50° C. Since the melting points are close to each other, the above function is effectively provided and high bond strength can be achieved.

It is also preferred that the assembly of fibers is made from a material having a slightly higher melting point than that of the substrate. In this case, since the assembly of fibers is still solid when the substrate is molten, the fibers are forced into the molten substrate by the pressure of the transducer and the molten resin of the substrate sticks around the fibers, thereby further improving the bonding strength.

The soundproof material of the present invention can be collected and reclaimed without separating the substrate from the assembly of fibers. The substrate and the assembly of fibers are both made from thermoplastic resins, and the assembly of fibers is used in the soundproof material in a proportion of 10 wt % to 15 wt % at the most and rarely affects the physical properties of the reclaimed product. Therefore, it can be used in a reclaimed product whose required physical properties are not so strict.

Since an adhesive agent or adhesive double-coated tape is not required, bonding between the substrate and the assembly of fibers may be partial, and then the number of bonding steps is small, the soundproof material can be produced at a low cost.

The substrate referred to in the present invention is not limited to a particular type if it is made from a reclaimable thermoplastic resin. Various thermoplastic resins can be used by forming them into a predetermined shape by various forming methods. To improve strength, a reinforcement such as glass fibers can be mixed.

The assembly of fibers is formed from a thermoplastic resin different from the material of the substrate. The assembly of fibers is composed of a woven cloth, knitted cloth or knitted strings but is preferably composed of a nonwoven cloth. When the assembly of fibers is composed of a nonwoven cloth, the sizes and the number of pores present between the fibers are optimized for sound absorption, thereby improving sound absorbing properties.

Most of the fibers constituting the assembly of fibers are preferably fibers having a fineness or denier of 1 to 3. If the fineness of the fibers is less than 1D, it is difficult to secure a sufficient thickness within a predetermined weight. In order to effectively absorb the sound, a large amount of fibers is required, thereby increasing costs and weight. When the fineness is more than 3D, the volume of each pore becomes large and then the number of pores decreases, thereby deteriorating sound absorbing properties.

The apparent density of the assembly of fibers is preferably in the range of 0.02 g/cm$^3$ to 0.10 g/cm$^3$. When the apparent density is smaller than 0.02 g/cm$^3$, the volume of each pore between fibers becomes large, thereby deteriorating sound absorbing properties. When the apparent density is larger than 0.10 g/cm$^3$, it is difficult to secure a sufficient thickness of the soundproof material within a predetermined weight. When the thickness of the assembly of fibers is increased to secure sound absorbing properties, a large amount of fibers is required, thereby boosting costs and weight.

It is desirable to perform the assembly of fibers to fit the surface configuration of the substrate. The preformation of fibers can be conducted easily by heating it at a temperature higher than its thermal deformation temperature and cold pressing it.

The assembly of fibers used in the present invention is composed of thermoplastic resin fibers. Therefore, reclaimed fibers can be used in at least part of the fibers constituting the assembly of fibers. Since a reclaimed product is inferior to a new product in color and appearance, it is difficult to use it in a decorative part. The soundproof material is rarely used in the top surface of a car or the like. The soundproof material rarely affects sound absorbing properties even though it has poor appearance. Therefore, it is preferable to use the reclaimed fibers as a soundproof material, thereby effective using resources on the earth.

It is preferred to include binder fibers having a lower melting point than those of other fibers constituting the assembly of fibers. When the assembly of fibers is shaped by heating it at a temperature higher than the melting point of the binder fibers but lower than the melting point of other fibers, only the surface of the binder fibers can be molten. Since the other fibers are bonded together through the binder fibers, the formed shape is maintained and the binder fibers can be used as part of the fibers constituting the assembly of fibers. Therefore, pores between fibers are rarely filled with the molten binder, the number of pores formed between fibers increases, and the volume of each pore becomes small, thereby improving sound absorbing properties.

The binder fibers fineness or deniers 2D to 4D are preferred. Although it is preferable for the binder fibers to be smaller fineness, the binder fibers' strength of bonding other fibers becomes small when the fineness of the binder fibers is smaller than that of other fibers, thereby making it difficult to secure stiffness. Therefore, the fineness is set to 2D or more. When the fineness is larger than 4D, the pores between fibers may be blocked, thereby reducing sound absorbing properties. Therefore, the fineness is set up to 4D or less.

The binder fibers may be contained in the assembly of fibers in 10 wt % to 40 wt % thereof. When less than 10 wt %, the binder fibers' strength of bonding other fibers is small, thereby making it difficult to secure stiffness. When more than 40 wt %, the pores between fibers may be blocked, thereby deteriorating sound absorbing properties.

It is preferable to use fibers as the binder fibers, whose inner part is formed from a resin having a high melting point and whose outer layer made from a resin having a low melting point is coated onto the inner part. When such double-layer fibers are used as binder fibers, the amount of the binder fibers molten at the time of ultrasonic vibration can be further reduced, and the blocking of pores between fibers is prevented, thereby further improving sound absorbing properties.

In the soundproof material of the present invention, the substrate and the assembly of fibers are partially or locally bonded to each other integrally. The number of such bonding portions is not particularly limited and is preferably made as small as possible.

More preferably, the bonding interface between the assembly of fibers and the substrate may be uneven. Thereby, the contact area between the assembly of fibers and the substrate in the bonding portion increases, thereby making it possible to secure sufficient bonding strength even though they are made from different materials.

The reasons why the bonding strength is improved by making the joint interface uneven are that a thin layer of the assembly of fibers is formed in a vertical plane which is the boundary between a concave portion and a convex portion of the uneven interface at the time of melting by vibration. The molten resin of the substrate is mixed into such thin layer and tangled with the molten resin of the assembly of fibers mechanically and complicatedly and the thin layer of the assembly of fibers connects the concave portion and the convex portion. It is desirable that two or more convex portions are formed.

The depth of the concave portion is preferably set to 1 mm to 5 mm. When the depth is larger than 5 mm, the layer of the assembly of fibers on the vertical plane which is the boundary between the concave portion and the convex portion is cut off with the result of a reduction in bonding strength. When the depth is smaller than 1 mm, the contact area on the vertical plane decreases with the result of a reduction in bonding strength. The ratio of the project area of the concave portion to the project area of the convex portion is preferably 1/5 to 3/1. When the ratio concave portion/convex portion is smaller than 1/5 or larger than 3/1, the contact area between the assembly of fibers and the substrate decreases with the result of a reduction in bonding strength.

Concave portions and convex portions can be formed in the joint portion by making the end surface of the transducer for ultrasonic welding uneven.

The following example is given to further illustrate the present invention.

EXAMPLE

A soundproof material according to an embodiment of the present invention shown in FIG. 1 is used as a car engine cover and comprises a substrate 1 made from polyamide (6-nylon) containing glass fibers and a PET nonwoven cloth 2 bonded to a rear side of the substrate 1. The nonwoven cloth 2 is bonded to the substrate 1 through joint portions 20 integrally. A process for producing this soundproof material is described hereinafter.

50 wt % of first PET fibers of fineness 2D having a melting point of about 250° C., 20 wt % of second PET fibers of fineness 3D having a melting point of about 250° C. and 30 wt % of PET binder fibers of fineness 2D having a melting point of 160° C. are mixed together to form a nonwoven cloth 2 of 700 g/m².

This nonwoven cloth 2 was heated upto a temperature of 190° C., and then cold pressed to shape it into a predetermined shape having a thickness of 10 mm. At this point, the surfaces of the binder fibers are molten to bond the first PET fibers and the second PET fibers together, thereby completing the shaping of the nonwoven cloth 2.

Meanwhile, the substrate 1 is formed by injection molding using polyamide (melting point of about 190° C.) containing glass fibers. The nonwoven cloth 2 is placed on the rear surface of the substrate 1. A transducer having a diameter of 15 mm is pressed toward the substrate 1 from the surface of the nonwoven cloth 2 with a pressure of about 5 kg/cm², and the nonwoven cloth 2 and the surface of the substrate 1 are melt by ultrasonic vibrating the transducer, thereby forming a plurality of spot-like joint portions 20 having a depth of about 2 mm.

Figure 2:
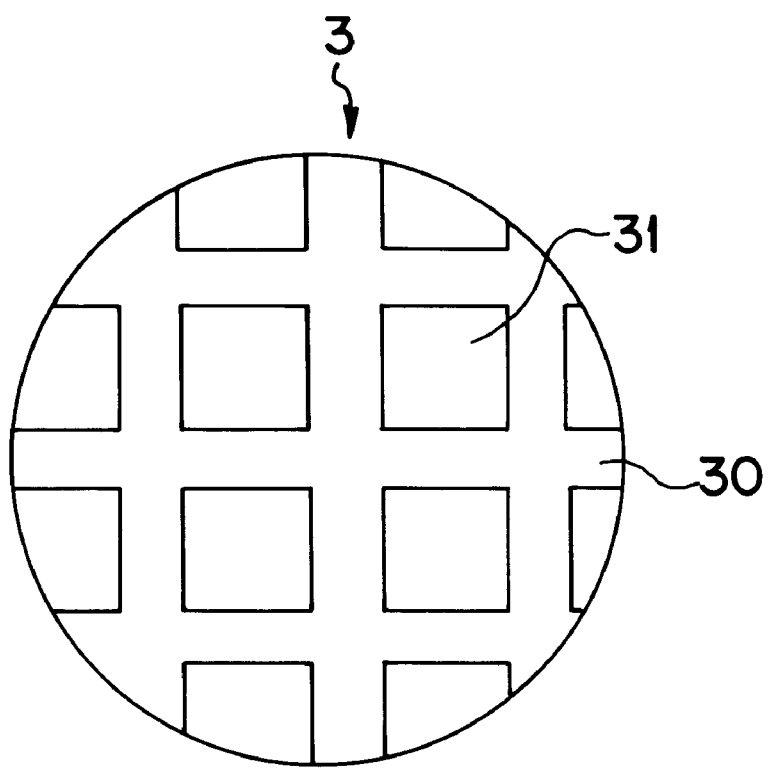
FIG. 2 is a front view of an end surface of a ultrasonic transducer used in the production of the sound absorbing material according to the embodiment of the present invention.

The end surface of the transducer is uneven, and concave portions, i.e. grooves 30 and square convex portions 31 defined by the grooves 30 as shown in FIG. 2. The groove 30 has a depth of 3 mm and a width of 2 mm, the projection portion 31 is 3 mm square, and the ratio of the project area of the grooves 30 to the project area of the projection portions 31 (grooves 30/projection portions 31) is 1/1.7.

Thus, the nonwoven cloth 2 and the substrate 1 are bonded together integrally to produce a soundproof material.

The obtained soundproof material was measured for the peel strength of the nonwoven cloth 2 from the substrate 1 by a push-pull gauge. As a result, the nonwoven cloth 2 exhibits a high peel strength of about 100 N, whereby it is made clear that the nonwoven cloth 2 is bonded to the substrate 1 with a sufficient bond strength. When the transducer 3 having a flat end surface is used to form joint portions, the peel strength of the nonwoven cloth 2 is about 10 N which is the about 10% of the above example. That is, it has been found that the bond strength is effectively improved by making the end surface of the transducer 3 uneven.

Figure 3:
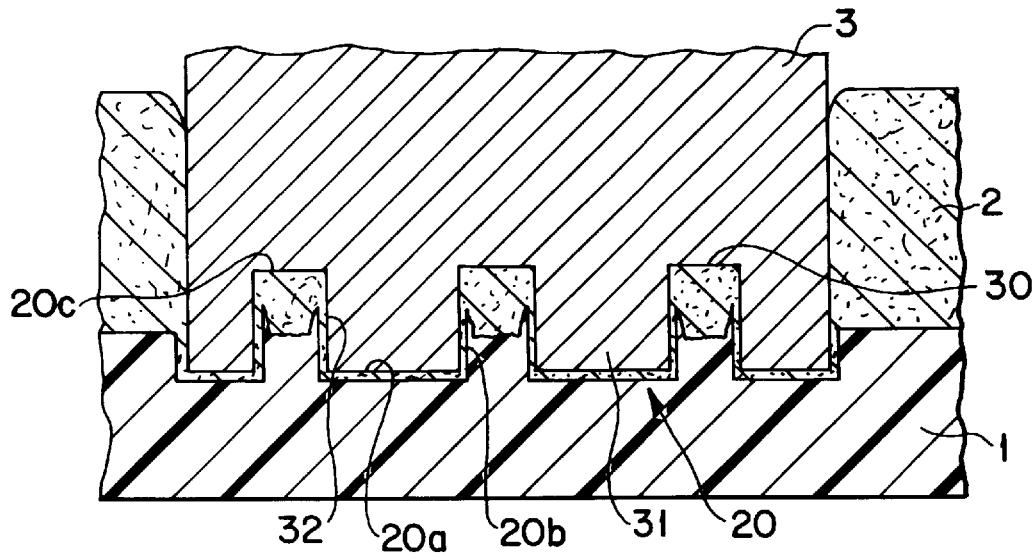
FIG. 3 is an enlarged sectional view showing a relation between the sound absorbing material according to the embodiment of the present invention and the ultrasonic transducer.
Figure 4:
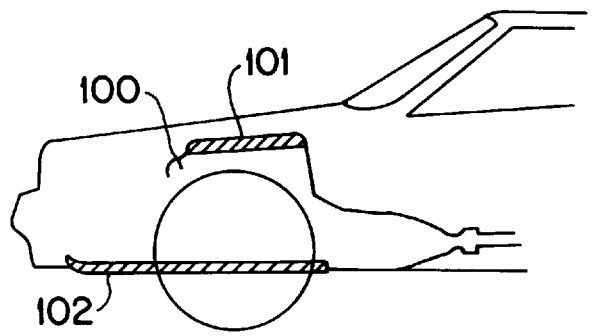
FIG. 4 is a diagram showing the arrangement of a sound absorbing material of the prior art in a car.
Figure 5:
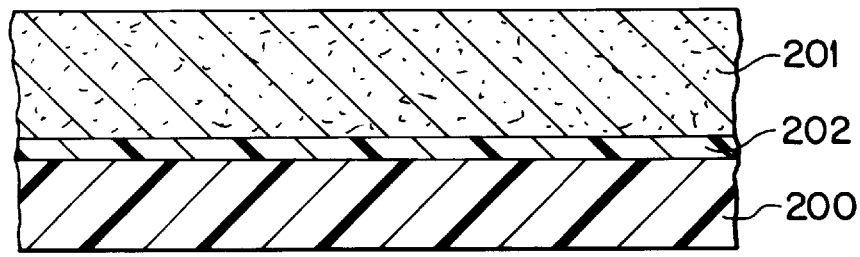
FIG. 5 is a sectional view of the sound absorbing material of the prior art.

It is considered from the observation of the joint portion that the high bond strength could be obtained from the following function in the soundproof material of the above example. That is, as shown in FIG. 3, when the transducer 3 is pressed against the surface of the nonwoven cloth 2 and the ultrasonic vibration is applied, the projection portion 31 press the molten nonwoven cloth 2 and the substrate 1, whereby concave portions 20a are formed by the strongly compressed nonwoven cloth 2 and substrate 1 and excess portions produced thereby go into the grooves 30. A thin resin layer 20b is formed on a vertical plane 32 which is the boundary between the convex portion 31 and the groove 30. In the groove 30, the nonwoven cloth 2 and the substrate 1 are pressure contacted to each other in a molten state to form a convex portion 20c.

Since the resin layer 20b is a thin film formed from the nonwoven cloth 2 and the substrate 1, the pores between fibers in the nonwoven cloth 2 may remain as they are. In this case, the molten resin of the substrate 1 is filled into the pores in the nonwoven cloth 2 and tangled with the nonwoven cloth 2 complicatedly. In the convex portion 20c formed in the groove 30, since the amount of the nonwoven cloth 2 compressed is relatively small as compared with in the concave portions 20a, fine irregularities are formed along the interface between the nonwoven cloth 2 and the substrate 1 due to the fiber shape of the nonwoven cloth 2 with the result of a large contact area. Further, the nonwoven cloth 2 continuously extends from the projection portion 31 along the vertical plane 32 into the groove 30. For these reasons, the soundproof material of this example shows high bond strength.

That is, in the soundproof material of this example, the nonwoven cloth 2 and the substrate 1 are made from thermoplastic resins, and molten by ultrasonic vibration and bonded together with high bonding strength. Therefore, as the soundproof material does not contain a foreign material such as an adhesive or adhesive double-coated tape, it can be collected and reclaimed without separating the nonwoven cloth 2 from the substrate 1. Since the step of removing the adhesive or adhesive double-coated tape is not required, costs required for reclamation can be greatly reduced.

Since an adhesive or adhesive double-coated tape is not required to produce the soundproof material of this example, material costs can be reduced and the step of affixing the nonwoven cloth 2 with an adhesive or adhesive double-coated tape is not required, thereby reducing the number of steps. An inexpensive soundproof material can be thereby produced.

That is, the soundproof material of the present invention shows the same or higher sound absorbing properties than the soundproof material of the prior art and can be collected and reclaimed without separating the assembly of fibers from the substrate, the number of steps required for reclamation and costs can be reduced.

Since an adhesive or adhesive double-coated tape is not required, material costs and the number of steps can be reduced. Therefore, an inexpensive soundproof material can be provided.

What is claimed is:

1. A soundproof material, comprising:

a thermoplastic resin substrate; and an assembly of fibers laminated on a surface of said thermoplastic resin substrate, said assembly of fibers being comprised of material that differs from material used to prepare said thermoplastic resin substrate, said assembly of fibers and said thermoplastic resin substrate being bonded together integrally through a joint interface which is at least partially melted by ultrasonic vibration, wherein at least one concave portion having a depth of 1 mm to 5 mm is formed in said thermoplastic resin substrate at the joint interface between said thermoplastic resin substrate and said assembly of fibers.

2. The soundproof material of claim 1, wherein the joint interface has at least two convex portions and the ratio of the project area of the concave portions to the project area of the convex portions (concave portions/convex portions) is 1/5 to 3/1.

3. The soundproof material of claim 1, wherein the assembly of fibers is composed of a nonwoven cloth formed into a predetermined shape.

4. The soundproof material of claim 3, wherein the nonwoven cloth includes fibers having a higher melting point and fibers having a lower melting point.

5. The soundproof material of claim 4, wherein the lower melting point fibers constitute about 10% to 40% of the fibers in the non-woven cloth, and have a denier of 2 to 4.

6. A soundproof material, comprising:

a thermoplastic resin substrate; and a non-woven cloth laminated on a surface of said thermoplastic resin substrate, said non-woven cloth being comprised of material that differs from material used to prepare said thermoplastic resin substrate, said non-woven cloth and said thermoplastic resin substrate being bonded together integrally through a joint interface which is at least partially melted by ultrasonic vibration, wherein at least one concave portion having a depth of 1 mm to 5 mm is formed in said thermoplastic resin substrate at the joint interface between said thermoplastic resin substrate and said non-woven cloth.

* * * * *